(12) United States Patent
Bruce et al.

(10) Patent No.: US 9,802,711 B2
(45) Date of Patent: Oct. 31, 2017

(54) MULTI-LAYER DE-ICING SKIN FOR AIRCRAFT PLATFORMS

(71) Applicant: Sunlight Photonics Inc., South Plainfield, NJ (US)

(72) Inventors: Allan James Bruce, Scotch Plains, NJ (US); Michael Cyrus, Castle Rock, CO (US); Sergey Frolov, Murray Hill, NJ (US)

(73) Assignee: Sunlight Photonics Inc., South Plainfield, NJ (US)

( * ) Notice: Subject to any disclaimer, the term of this patent is extended or adjusted under 35 U.S.C. 154(b) by 137 days.

(21) Appl. No.: 14/070,344

(22) Filed: Nov. 1, 2013

(65) Prior Publication Data

US 2015/0122947 A1    May 7, 2015

(51) Int. Cl.
   *B64D 15/20*    (2006.01)
   *B64D 15/08*    (2006.01)
   *B32B 5/00*    (2006.01)
   *B32B 27/08*    (2006.01)
   *B32B 27/28*    (2006.01)
   *B32B 27/32*    (2006.01)
   *B32B 3/26*    (2006.01)

(52) U.S. Cl.
   CPC ............... *B64D 15/08* (2013.01); *B32B 3/26* (2013.01); *B32B 5/00* (2013.01); *B32B 27/08* (2013.01); *B32B 27/283* (2013.01); *B32B 27/322* (2013.01); *B64D 15/20* (2013.01); *B32B 2307/30* (2013.01); *B32B 2307/412* (2013.01); *B32B 2307/70* (2013.01); *B32B 2605/18* (2013.01)

(58) Field of Classification Search
   CPC .......... B64D 15/30; B64D 2700/62087; B64D 2033/0233; B64D 15/20; B64D 15/22; B64D 15/00; B64D 15/16; B64F 5/0054
   USPC ............. 244/134 R, 134 C; 427/155; 252/70
   See application file for complete search history.

(56) References Cited

U.S. PATENT DOCUMENTS 4,265,974 A * 5/1981 Gordon .......................... 428/432
4,434,201 A    2/1984 Humphreys
(Continued)

FOREIGN PATENT DOCUMENTS

EP    0428011 A2    5/1991
EP    2196393 A1    6/2010

OTHER PUBLICATIONS

"SLIPS: Slippery Liquid-Infused porous Surface", Wyss Institute, harvard university, Jun. 12, 2012.*
(Continued)

*Primary Examiner* — Assres H Woldemaryam
(74) *Attorney, Agent, or Firm* — Mayer & Williams, PC; Stuart H. Mayer

(57) ABSTRACT

An ice resistant structure is provided which includes a self-supporting, structural platform, a retaining, protective layer and a subsurface anti-icing (AI) and/or de-icing (DI) layer. The retaining, protective layer is disposed over the self-supporting, structural platform. The subsurface anti-icing (AI) and/or de-icing (DI) layer is located between the self-supporting, structural platform and the retaining, protective layer. The subsurface Al and/or DI layer is a functional layer such that an Al and/or DI agent is released to a surface of the retaining protective layer by an activation mechanism responsive to a change in an environmental condition.

29 Claims, 2 Drawing Sheets

(56) References Cited

U.S. PATENT DOCUMENTS

| | | | |
|---|---|---|---|
| 5,436,351 A * | 7/1995 | Coffey et al. | 548/324.1 |
| 5,934,617 A | 8/1999 | Rutherford | |
| 7,279,197 B2 * | 10/2007 | Alger | 427/355 |
| 8,137,578 B2 | 3/2012 | Koctod | |
| 8,221,644 B2 * | 7/2012 | Smith et al. | 252/70 |
| 2002/0139956 A1 * | 10/2002 | Simendinger et al. | 252/70 |
| 2006/0196994 A1 | 9/2006 | Chow et al. | |
| 2007/0102573 A1 | 5/2007 | Goto | |
| 2008/0175987 A1 * | 7/2008 | Carter | 427/155 |
| 2009/0110935 A1 * | 4/2009 | Lewis et al. | 428/421 |
| 2012/0193569 A1 | 8/2012 | Koefod | |
| 2013/0101800 A1 * | 4/2013 | Campazzi et al. | 428/167 |
| 2013/0146716 A1 | 6/2013 | Gettinger | |

OTHER PUBLICATIONS

"Preparation of fluorine-doped tin oxide films at low substrate temperature by an advanced spray pyrolysis technique, and their characterization", 2010.*

"Analysis and Mitigation of Icing Effects on Wind Turbines", Wind Energy Research Laboratory, University of Quebec, Canada, Apr. 2011.*

Charles c. Ryerson, "Assessment of Superstructure Ice Protection as Applied to offshore Oil Operations Safety", 2009.*

ACRP, "Formulations for Aircraft and Airfield Deicing and Anti-Icing: Aquatic Toxicity and Biochemical Oxygen Demand", University of South carolina, 2008.*

Mohantey et al. "An accessible micro-capillary electrophoresis device using surface-tension-driven flow", 2009.*

John M. Sayward, "Seeeking Low Ice Adhesion", 1979.*

Author unknown "Flight and Aircraft Engineer" Issued Apr. 11, 1946, 3 pages.

Author unknown, "Premier Ice Protection for General Aviation" issued by CAV Aerospace, Inc., 2 pages.

Author Unknown "The anti-icing technology of SafeLane surface overlay", downloaded Jul. 8, 2013, 5 pages.

Author Unknown, "A slippery surface that can repel almost everything", 1 page.

Author Unknown, "Nanostructured Surfaces & Coating" ICCM17 Edinburgh, 2 pages, Jul. 27-31, 2009.

Gohardani "The Exploration of Icephobic Materials and Their Future Prosepcts in Aircraft Icing Applications", (2012) J Aeronaut Aerospace, vol. 1, issue 4, 2 pages.

Laforte et al., "Icephobic Material Centrifuge Adhesion Test" IW AIS XI, Montreal, Jun. 2005, 5 pages.

Wang, et al., "Effects of nano-fluorcarbon coating on icing", Applied Surface Science, vol. 258, Issue 18, Jul. 2012 7219-7224.

Varanasi et al., "Frost formation and ice adhesion on superhydrophobic surfaces" applied Physics Letters 97, (2010), 3 pages.

Kim et al., "Liquid-infused nanostructured surfaces with extreme anti-ice and anti-frost performance" ACS Nano, Aug. 28, 2012;6(8):6569-77 (Abstract).

Farhadi et al., "Anti-icing performance of superhydrophobic surfaces" Applied Surface Science (2011) 257, 6264-6269 (Abstract—1 page)

Author Unknown, "De-icing for To-day", Apr. 11, 1946, 2 pages.

Wilson et al., Inhibition of ice nucleation by slippery liquid-infused porous surfaces (SLIPS), Phys Chem Chem Phys, Jan. 14, 2013; 15(2): 581-5 (Abstract only).

* cited by examiner

MULTI-LAYER DE-ICING SKIN FOR AIRCRAFT PLATFORMS

BRIEF DESCRIPTION

It is well known that accretion of ice on an aircraft prior to, or during, a mission can impair aero-dynamic performance and stability, up to, and including, mission termination or catastrophic failure. Icing can reduce the rate of lift, rate of climb and fuel efficiency while increasing drag, stall speed, weight, and power requirement. Icing can also impart indirect penalties including the need for on-board sensing and correction equipment which can reduce payload capacity. Icing can also impact launch, landing and flight paths. For all of these reasons, considerable attention has therefore been paid to the development and implementation of anti-icing (AI) techniques, which can inhibit ice accretion and de-icing (DI) techniques which can eliminate accreted ice. AI techniques generally involve intrinsic properties of the aircraft structure or materials, activated processes prior to ice accretion or the avoidance of environments conducive to icing. DI techniques generally involve activated responses following the accretion of ice, including changing flight patterns, which may reverse the accretion. In practice, individual AI and DI methods are seldom completely effective for an entire mission, including take-off and landing. The implementation of multiple and complementary AI and/or DI approaches is therefore desirable to adequately reduce mission risks.

Ice accretion in-flight typically occurs when an aircraft surface, at a temperature below freezing, encounters supercooled liquid water. Depending on the amount of water present, droplet size, air temperature, surface geometry and speed, this water may freeze immediately to form conformal "rime ice" or it may flow over the surface before freezing resulting in non-conformal "glaze ice". The latter is generally identified as the most hazardous for aircraft performance. Conditions conducive for icing are most prevalent at temperatures between 0 and −35° C. and at relatively low altitudes. It is a serious concern for most aircraft operating within this range. On-board AI and/or DI capabilities may be required to operate for extended periods during such flights. At higher altitudes, typically there is low atmospheric moisture and, even at low temperatures, conditions are less conducive for ice accretion. For aircraft operating in this range, the conditions encountered during ascent and descent are the most critical for icing and on-board AI and/or DI capabilities may only need to operate during these critical phases of operation. Furthermore, depending on the aircraft design and operation, ice accretion may be predominantly localized at certain areas of the structure for example at propellers and leading edges of the wings and tail. It may therefore be sufficient for AI and DI solutions to function only at these locations.

Current AI technologies include preventative heating and also the use of coatings and/or structured surfaces which promote poor water droplet adhesion. Current DI technologies include on-ground, and/or on-board, heating, use of chemical de-icing agents and/or mechanical removal. Existing on-board DI methods typically introduce added cost, added weight, increased power consumption, as well as potential airframe compatibility and environmental issues.

Recently proposed AI technologies involving "icephobic" solutions typically employ hydrophobic coatings or surfaces on which water droplets have high contact angles and poor adhesion. Insofar as this poor adhesion can extend to the droplets when frozen, the ice droplets may be shed under the effects of gravity, wind-shear or vibration from the aircraft platform. Hydrophobic materials have traditionally included low-surface energy materials, including lubricants, waxes and other materials including fluoro-polymers, alkyl silanoxanes and similar or related products. More recently, bio-mimicking (e.g. mimicking lotus leaf topography) micro-to-nano structured "super" hydrophobic surfaces have been engineered in the lab, which rely on their topographic structure, spacing, and air gaps to inhibit effective wetting of water droplets, resulting in high contact angles and poor adhesion. However, recent studies of the effectiveness of such micro-to-nano structured surfaces as AI agents have revealed that they can be less effective under conditions of frosting, where ice can be formed on all surfaces from water in the vapor phase. This not only obviates the icephobic properties of such materials under conditions commonly experienced by aircraft, but provides a mechanism by which micro-to-nano structured surfaces can be damaged in repeat icing/deicing cycles which can also diminish, or obviate, their super-hydrophobic or icephobic characteristics in regard to droplets. The current opinion is therefore that micro-to-nano structured surfaces will not be a universal solution to icing for aircraft, or indeed other, platforms.

Current chemical freezing point depressant de-icing and/or anti-icing fluids are typically sprayed on an aircraft structure prior to flight. Most commonly glycol based fluids are used for de-icing aircraft on the ground and viscous glycol based fluids are used to coat the aircraft structure to provide anti-icing protection before flight. This anti-icing protection typically has a short life during flight either through consumption or due to stripping e.g, in airflows. As a refinement in some piloted aircraft, TKS ("weeping wing") technology is employed whereby de-icing fluids are delivered, on-demand, from an on-board reservoir via pipelines to surface nozzles at critical regions of the aircraft structure. This has obvious limitations in terms of reservoir capacity, added weight and power consumption which can make it unsuitable for many applications. The potential environmental impact of waste chemicals is also a concern. Approximately 25 million gallons of glycol based fluids were used for aircraft de-icing in the USA in 2008.

For piloted aircraft, currently permitted responses to icing are defined by National and International regulations. These encompass aircraft design, platform certification, flying protocols and both on-ground and in-flight corrective measures. Prior to take-off, current protocols include the use of external on-ground DI facilities or pilot-initiated on-board DI responses. Ice accretion during flight is assessed by the pilot, potentially aided by sensors, and addressed by operational avoidance, or by the activation of on-board DI capabilities which are pilot initiated.

Regulations for Unmanned Aerial Vehicles (UAVs), which are unpiloted aircraft that are either controlled remotely or are flown autonomously, are under development. UAVs are commonly categorized based on their design and performance spanning the range from small Low Altitude (LA) to large High Altitude Long Endurance (HALE) vehicles. UAV technology is emerging as an increasingly important factor in our society for civilian and military applications. UAVs could provide improved service over existing systems in a large number of civil applications, ranging from border patrol, coastal surveillance, monitoring of natural disasters, meteorology, cartography and highly flexible telecommunication relay stations. The required endurance may be in the range of a few hours in the case of law enforcement, border surveillance, forest fire fighting or power line inspection. Other high altitude applications, such as those involving weather research, forecasting and environmental monitoring, may require the UAVs to be airborne for days, weeks, months or even years.

It is perceived that remote piloting lacks the physical feedback that icing creates and that ice accretion is difficult to assess remotely with sensors until it is beyond the point of reversal. With no pilot on-board, commercial regulations typically default to the prohibition of UAV flights in weather conditions conducive to icing. Consequently, UAV missions are frequently delayed or cancelled in response to adverse weather forecasts. As the scope of UAV applications and missions expands and the demand for "all-weather" operation increases this is likely to become an unacceptable limitation.

Ice accretion can be a particularly serious issue for UAVs because of their unique designs, light-weight, flying patterns and the added demands placed on their autonomous control systems. UAV operations may therefore require enhanced forecast support and detector systems at the vehicle bases or on the vehicles themselves. HALE UAVs are capable of flying above icing levels but are typically at high risk during ascent and descent due to their optimized wing shapes. Other UAVs with more standard designs may be unable to fly above the icing levels. Current AI and DI approaches are generally not optimized for UAVs.

SUMMARY

In accordance with one aspect of the invention, an ice resistant structure is provided which includes a self-supporting, structural platform, a retaining, protective layer and a subsurface anti-icing (AI) and/or de-icing (DI) layer. The retaining, protective layer is disposed over the self-supporting, structural platform. The subsurface anti-icing (AI) and/or de-icing (DI) layer is located between the self-supporting, structural platform and the retaining, protective layer. The subsurface AI and/or DI layer is a functional layer such that an AI and/or DI agent is released or otherwise directed to a surface of the retaining protective layer by an activation mechanism responsive to a change in an environmental condition.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components have not been described in detail, so as not to obscure the following description. Further, the embodiments disclosed are for exemplary purposes only and other embodiments may be employed in lieu of, or in combination with, the embodiments disclosed.

As detailed below, an anti-icing (AI) and/or de-icing (DI) skin is provided for the outer surfaces of an aircraft. The skin is comprised of multiple integrated layers which might be formed monolithically or by hybrid methods. The different layers of the skin may be made from differing materials and/or have differing structures and/or differing functionality.

In some embodiments, for example in unmanned aerial vehicle (UAV) applications, the skin performs as an outer structural element, is light-weight and requires little or no power for the AI and/or DI functions. In addition, AI and/or DI functionalities are designed to be long lived and effective under environmental conditions conducive to icing. In cases where critical AI and/or DI materials are consumed, eroded or transformed, it is desirable to have a facile method to replenish them and/or to re-establish and/or to maintain functionality while the UAV is in-operation and/or between operations.

While the invention will be illustrated as being applicable to the wings of a UAV, more generally the invention is applicable to any number of different exposed surfaces such as the surface of the fuselage, propeller and the like, and for a wide range of different aircraft designs. Moreover, the invention is also applicable to a wide range of other platforms and surfaces for which ice-resistant properties are desirable.

Figure 1:
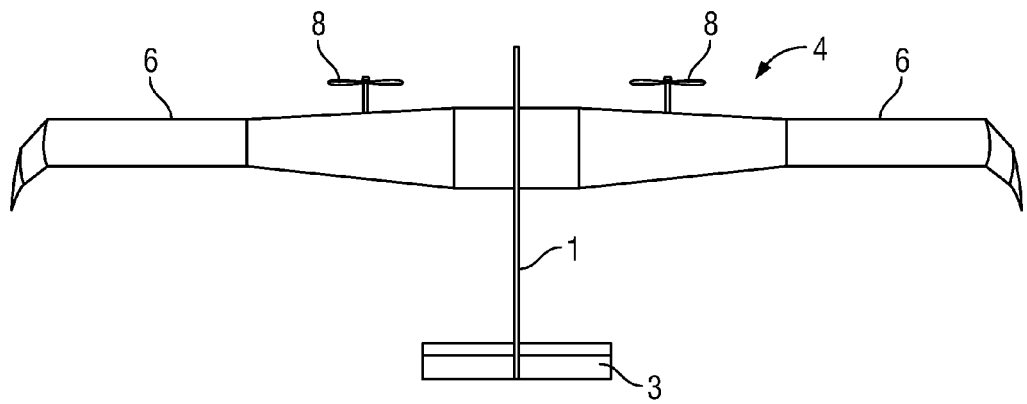
FIG. 1 shows a top view of one example of an unmanned aerial vehicle (UAV) to which the present invention may be applied.

FIG. 1 shows a top view of one example of a high altitude, long endurance, solar powered UAV to which the present invention may be applied. The aircraft includes a tubular fuselage 1 with wings 6 and a tail fin carrying a tailplane 3, a mainplane 4 and propellers 8. In some embodiments the upper surface of each wing 6 may be covered with arrays of photovoltaic cells (not separately shown), or such cells may be housed within the mainplane structure beneath a transparent upper skin. Each wing 6 includes a structural, self-supporting skin that extends over an open frame.

Figure 2:
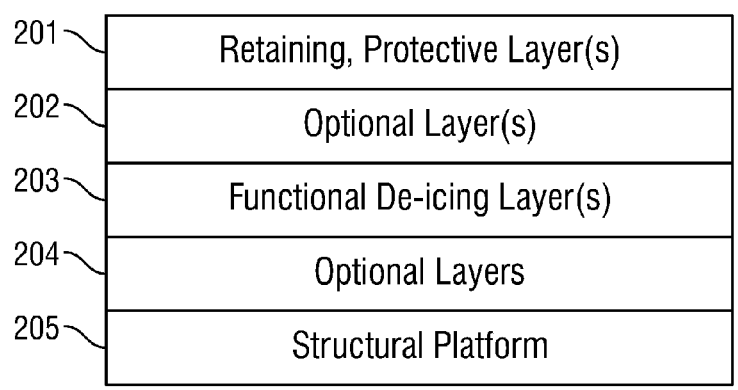
FIG. 2 shows a schematic cross-sectional diagram of one embodiment of an aircraft wing such as the wing of the UAV shown in FIG. 1.

FIG. 2 is a schematic cross-sectional diagram of one embodiment of an aircraft skin such as skin 116 shown in FIG. 1. The skin 200 is stretched or otherwise extends over a frame such as frame 118 shown in FIG. 1. More generally, the structural platform 205 may be any self-supporting structure or frame or the like over which anti- and/or de-icing layers are formed or cover, partially or completely. A functional de-icing layer 203, described in more detail below, is disposed over the structural platform 205. A retaining, protective layer 201 is disposed over the functional de-icing layer 203. Thus, in this embodiment, the wing is provided with a de-icing mechanism having functional components located in a sub-surface layer.

As further shown in FIG. 2, in some embodiments optional layers 204 and 202 may be provided, which respectively separate the structural platform 205 from the functional de-icing layer 203 and the functional de-icing layer 203 from the retaining, protective layer 201. The optional layers 202 and 204 may or may not be structural layers and they may or may not provide or otherwise facilitate de-icing or anti-icing functionality.

In some embodiments the de-icing functional layer 203 may perform its de-icing function using chemical de-icing in which a chemical agent (including precursors thereof) are stored within the functional layer 203, which in effect acts as a reservoir. Examples of such chemical agents or precursors include, by way of example, hydrophobic oils, gels, fluorinated materials, so-called "slippery" liquids, as well as combinations thereof. One example of a slippery liquid is a fluorinated oil such as Krytox®. In some embodiments the chemical agents present in the de-icing layer 203 are replenishable during or between missions.

An alternative class of slippery materials that may be employed is referred to as a slippery liquid-infused porous surface (SLIPS) material. In a SLIPS material a "slippery" liquid, commonly a commercial lubricant, is infused in a porous/textured surface (though not a typical micro-to-nano structured surface) that has an affinity for the liquid. This affinity enables the liquid to be retained, yet exposed at the surface, where it can impart the icing resistant characteristics of hydrophobic liquids. Studies have demonstrated that ice nucleation on such surfaces under conditions conducive to frosting may be significantly inhibited even after repeat icing/de-icing cycles.

It should be noted that in some embodiments, functional de-icing layer may be replaced with a functional AI layer or even functional DI and AI layers.

Suitable materials for the retaining, protective layer 201 may be selected so that the layer 201 is corrosion resistant, has high strength, is pliable and/or formable, is permeable and selectively DI chemically retentive, if required, to enable the DI or AI functionality over an appropriate temperature range and operational conditions. In some cases the retaining, protective layer 201 may also incorporate anti-icing characteristics. This can be achieved by using a low surface energy material or a micro-to-nano structured material to induce hydrophobic characteristics. An example of a suitable material that may be employed for the retaining, protective layer 201 may be a fluorine based polymer such as Ethylene Tetrafluoroethylene (ETFE), which is hydrophobic and can furthermore be formed with micro-nano surface structuring.

The layers of the specified skin may be joined in several ways which include; fusing of similar or dissimilar, but separate, materials layers (e.g. by thermal lamination), or by using adhesives. The skin may also be formed by the sequential deposition and, or structuring of material layers in a monolithic form. One such sequential deposition method that may be employed is 3D printing.

The chemical agents may be transported from the functional de-icing layer 203, through any optional layers, to the retaining, protective layer 201, where they perform their de-icing function. In some embodiments a passive activation mechanism is used to drive or otherwise release the chemical agents to the retaining, protective layer 201 when de-icing is needed, after which the same mechanism is used to return the chemical agents to the de-icing functional layer 203. Of course, in order for the chemical agents to migrate in this manner there needs to be a permeation path between the de-icing functional layer 203 and the surface of the retaining, protective layer 201.

By way of example, some passive activation mechanisms that may be employed are responsive to temperature such that when the temperature drops below the freezing point of water, the chemical agents migrate to the surface of the retaining, protective layer 201 and migrate back to the de-icing functional layer 203 when the temperature rises above the freezing point of water. The migration may be reversibly driven, for example, by phase separation between e.g., a polymer such as polydimethylsiloxane (PDMS) and a chemical agent such as an alkyl molecule. The timeframe over which the chemical agents migrate to the surface of the retaining, protective layer 201 may extend over the length of a single flight or mission or multiple flights or missions. By making the migration reversible, the chemical agent can be substantially conserved and reused.

Other methods in addition to or instead of phase separation may be employed to reversibly drive the chemical agents to the surface of the retaining, protective layer 201 when a passive activation mechanism is employed that is responsive to temperature. For example, thermal expansion differences between and among the various layers and/or the structural platform shown in FIG. 2 may be employed to physically drive the chemical agents to the surface of the retaining, protective layer 201. By way of example, the structural platform (e.g., the wing frame and/or the skin) and/or optional layer 204 may be formed from a material that contracts more than the chemical agent as the temperature is reduced, thereby driving the chemical agent to the surface of the retaining, protective layer 201.

Another mechanism that may be used to reversibly drive the chemical agent to the retaining, protective layer 201 employs changes in the chemical affinity of the layers to the chemical agent with temperature. For instance, the physical adhesion of the chemical agent to the retaining, protective layer 201 may be greater at low temperatures than the physical adhesion of the chemical agent to the functional de-icing layer 203. That is, by making the retaining, protective layer 201 more receptive to the chemical agent at low temperatures and making the functional de-icing layer 203 more receptive to the chemical agent at higher temperatures, migration of the chemical agent between the two layers can be achieved.

As previously noted, a permeation path is needed between the functional de-icing layer 203 and the surface of the retaining, protective layer 201 in order for the chemical agents to migrate to the surface. This permeation path may be achieved with a porous or channeled structure, with appropriate size or chemical selectivity such as a diffusion membrane. Additionally, it may be desirable to provide a substantially impermeable layer between the functional de-icing layer 203 and the structural platform 205 to ensure that the chemical agents are only driven in one direction, i.e., to the surface of the retaining, protective layer 201.

Figure 3:
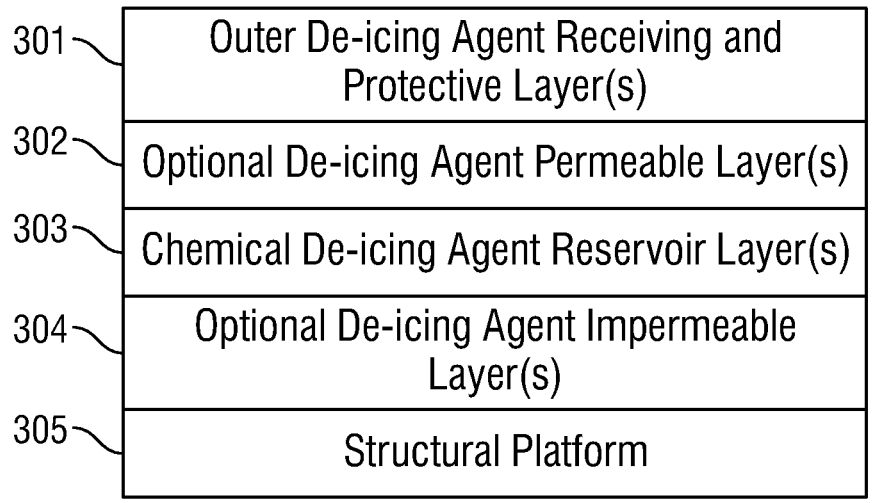
FIGS. 3 and 4 show alternative embodiments of the aircraft wing shown in FIG. 2.

FIG. 3 is schematic cross-sectional diagram of one particular embodiment of the aircraft wing shown in FIG. 2 in which the functional de-icing layer 203 of FIG. 2 is a chemical de-icing reservoir layer 303 for storing a de-icing agent. As shown, an optional de-icing agent permeable layer 302 may be in contact with the chemical de-icing reservoir layer 303, over which an outer, de-icing agent receiving and protective layer 301 is provided. An optional de-icing agent impermeable layer 304 is located between the chemical de-icing reservoir layer 303 and the structural platform 305

Figure 4:
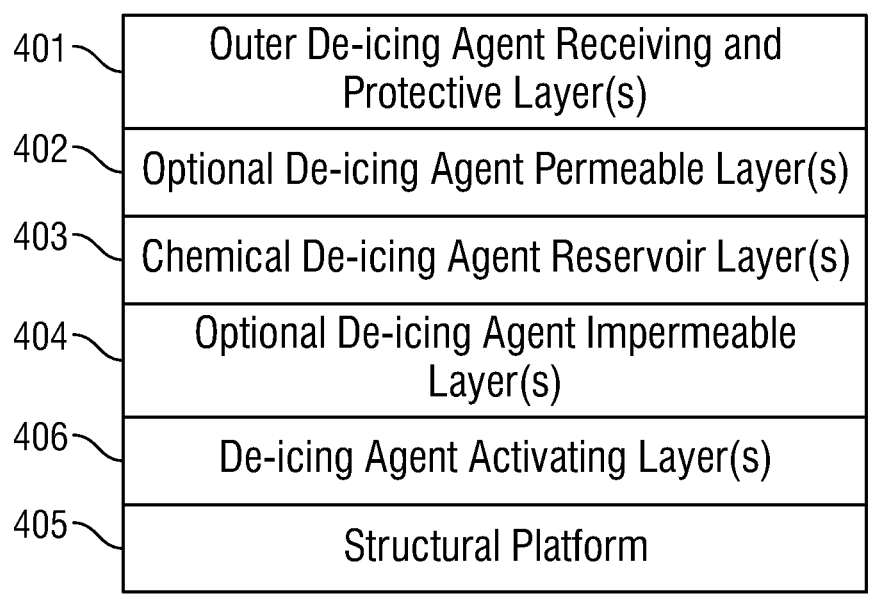

While a passive activation mechanism has been described above for driving the chemical agents to the surface of the retaining, protective layer, in some embodiments an active mechanism may be used as a supplement or replacement for a passive activation mechanism. FIG. 4 shows one such embodiment, which is similar to the embodiment shown in FIG. 3 except that a de-icing agent activating layer 406 is provided between the structural platform 405 and the de-icing agent impermeable layer 404. Depending on a variety of factors, the de-icing agent activating layer 406 may located between or within other layers shown in FIG. 4. The de-icing agent activating layer 406 may function by physically constricting, heating or otherwise stimulating the release of the chemical agent. For example, in one embodiment a piezoelectric element may be provided to physically drive the chemical agent to the surface of the retaining, protective layer 401.

The present invention constitutes multi-functional materials or skins, wherein it embodies structural functionality in addition to other functions such as anti-icing or de-icing. Multi-function materials in general as opposed to combinations of separately functioning components can impart various advantages including reduced materials usage, higher compactness, lighter weight, higher durability, easier manufacturability and lower cost. In the case of aircraft, UAVs or analogous platforms where such aspects can be mission enabling it is also desirable to include additional functionalities such as for power generation, sensing, electronics communications etc.

In such cases where several or multiple functions are integrated together in common materials or structures, attention should of course be paid to the compatibility of these functions. For instance in cases where electromagnetic energy or electrical signals or chemical species need to penetrate to a location for the given functionality e.g., a subsurface absorbing layer, then any materials, layers or structures which separate these functions from the source of the influencing effect, or it's resultant outlet, should be suitably transparent or permeable to the medium.

In some embodiments one or more semiconductor photovoltaic cells may be located within, between and/or below one or more of the layers shown in the FIGS. 3. If the layers in which the photovoltaic cells are located and those thereabove are substantially transparent to selected wavelengths of electromagnetic radiation (e.g., sunlight), then the photovoltaic cells will be able to produce electrical carriers therein. This is an example of a higher level multi-functional skin designed for the added purpose of on-platform power generation as well as structural and de-icing functionality power which can impart additional benefits in functionality, durability, weight reduction and cost. Other such examples include embodiments where RF antennae are integrated in the skin for the purpose of supporting communication functions. Other such examples include embodiments where chemical, physical, electronic or other sensory devices are integrated in the skin with due regard to their desired functionality.

The anti- and/or de-icing skins described above provide a number of advantages over conventional anti- and/or de-icing technologies. For example, in comparison to weeping wing technologies, the present invention has a highly integrated structure, is able to be passively activated and can consume relatively little or no AI/DI materials. In comparison to micro-to-nano structured "icephobic" surface technologies, the invention can operate in frosting conditions and includes sub-surface layers for performing AI/DI functionality. It also enables or enhances performance and longevity with the use of a retaining, protective layer. In addition, unlike micro-to-nano structured "icephobic" surface technologies, the functionality of the invention can be implemented in a dynamic rather than a static manner.

In comparison to SLIPS icephobic surface technologies, the invention has an upper retaining and protecting layer. Moreover, the invention functions both dynamically and reversibly rather than statically and includes mechanisms for delivering the chemical agents to the surface. The invention can also incorporate a micro-to-nano structured surface as the top layer, as opposed to the exposed porous structure that SLIPs materials simply use for fluid retention.

The invention claimed is:

1. An aircraft ice resistant structure, comprising:
a self-supporting, structural platform;
a retaining, protective layer disposed over the self-supporting, structural platform; and
a subsurface anti-icing (AI) and/or de-icing (DI) layer located between the self-supporting structural platform and the retaining, protective layer, the subsurface AI and/or DI layer being a functional layer such that an AI and/or DI agent is released to a surface of the retaining protective layer by an activation mechanism responsive to a change in an environmental condition, the AI and/or DI agent being hydrophobic agents, wherein the activation mechanism is an active activation mechanism, wherein the active activation mechanism operates using physical constriction to release the AI and/or the DI agent.

2. The aircraft ice resistant structure of claim 1 wherein the structural platform defines an aircraft wing and the retaining protective layer and the subsurface AI and/or DI layer define a skin on at least a portion of the aircraft wing.

3. The aircraft ice resistant structure of claim 2 wherein the aircraft wing is a Unmanned Aerial Vehicles (UAV) wing.

4. The aircraft ice resistant structure of claim 1 wherein the activation mechanism further includes a passive activation mechanism.

5. The aircraft ice resistant structure of claim 4 wherein the environmental condition is temperature.

6. The aircraft ice resistant structure of claim 4 wherein the passive activation method drives the AI and/or DI agent onto the surface using phase separation.

7. The aircraft ice resistant structure of claim 4 wherein the passive activation method drives the AI and/or DI agent onto the surface using phase separation and differences in rates of thermal expansion such that the differences in the rates of thermal expansion physically drive the AI and/or DI agent to the surface.

8. The aircraft ice resistant structure of claim 4 wherein the passive activation method drives the AI and/or DI agent onto the surface using chemical affinity changes of the retaining, protective layer and the subsurface AI and/or DI layer to the AI and/or DI agent.

9. The aircraft ice resistant structure of claim 4 wherein the passive activation method reversibly drives the AI and/or DI agent onto the surface such that the AI and/or DI agent is delivered onto the surface of the retaining protective layer in response to a first environmental condition and at least some of the AI and/or DI agent returns to the subsurface AI and/or DI layer in response to a second environmental condition.

10. The aircraft ice resistant structure of claim 9 wherein the first environmental condition is a temperature at or below about 0° C. and the second environmental condition is a temperature above about 0° C.

11. The aircraft ice resistant structure of claim 9 wherein the AI and/or DI agent is substantially preserved after being delivered onto the surface and returned to the subsurface AI and/or DI layer.

12. The aircraft ice resistant structure of claim 1 wherein the retaining, protective layer has AI and/or DI characteristics.

13. The aircraft ice resistant structure of claim 12 wherein the AI and/or DI characteristics are imparted by a chemical nature of agents contained in the retaining, protective layer.

14. The aircraft ice resistant structure of claim 12 wherein the AI and/or DI characteristics are imparted by a structural nature of the retaining, protective layer.

15. The aircraft ice resistant structure of claim 14 wherein the retaining, protective layer has a microstructure or nanostructure.

16. The aircraft ice resistant structure of claim 1 wherein the DI agent is selected from the group consisting of a hydrophobic oil, gel, and a fluorinated material.

17. The aircraft ice resistant structure of claim 1 wherein the subsurface AI and/or DI layer includes a slippery liquid-infused porous surface (SLIPS) material.

18. The aircraft ice resistant structure of claim 1 wherein the retaining, protective layer includes a fluorine-based polymer.

19. The aircraft ice resistant structure of claim 18 wherein the fluorine-based polymer includes Ethylene Tetrafluoroethylene (ETFE).

20. The aircraft ice resistant structure of claim 1 wherein the subsurface AI and/or DI layer includes polydimethylsiloxane (PDMS) and the AI and/or DI agent includes an alkyl molecule.

21. The aircraft ice resistant structure of claim 1 wherein the AI and/or DI agent in the subsurface anti-icing (AI) and/or de-icing (DI) layer is replenishable.

22. The aircraft ice resistant structure of claim 21, wherein the anti-icing (AI) and/or de-icing (DI) layer is replenishable by migration of AI or DI chemical agents from outside of outer layers of the ice resistant structure through intermediate layers to chemical agent retaining sub-surface layers.

23. The aircraft ice resistant structure of claim 1, wherein at least some of the layers are substantially transparent to selected wavelengths of electromagnetic radiation.

24. The aircraft ice resistant structure of claim 23, wherein, the at least some of the layers are substantially transparent to sunlight.

25. The aircraft ice resistant structure of claim 24 further comprising semiconductor photovoltaic cells located within, between and/or below one or more of the layers such that the photovoltaic cells receive sufficient sunlight to produce electrical carriers therein.

26. The aircraft ice resistant structure of claim 23, wherein at least some of the layers are substantially transparent to radio frequency (RF) radiation.

27. The aircraft ice resistant structure of claim 26 further comprising one or more antenna structures secured to the structural platform to function as part of RF receiving and/or transmitting devices.

28. The aircraft ice resistant structure of claim 23, wherein at least some of the layers are substantially permeable to chemical, radiative, or analogous agents, indicators or signals which are to be detectable for sensors.

29. The aircraft ice resistant structure of claim 28 further comprising one or more sensory devices or structures for chemical, radiative or analogous agents for performing sensory or informational detection and/or analysis.

\* \* \* \* \*